No. 858,630. PATENTED JULY 2, 1907.
J. B. SCHUMAN.
PNEUMATIC STACKER.
APPLICATION FILED NOV. 13, 1905.
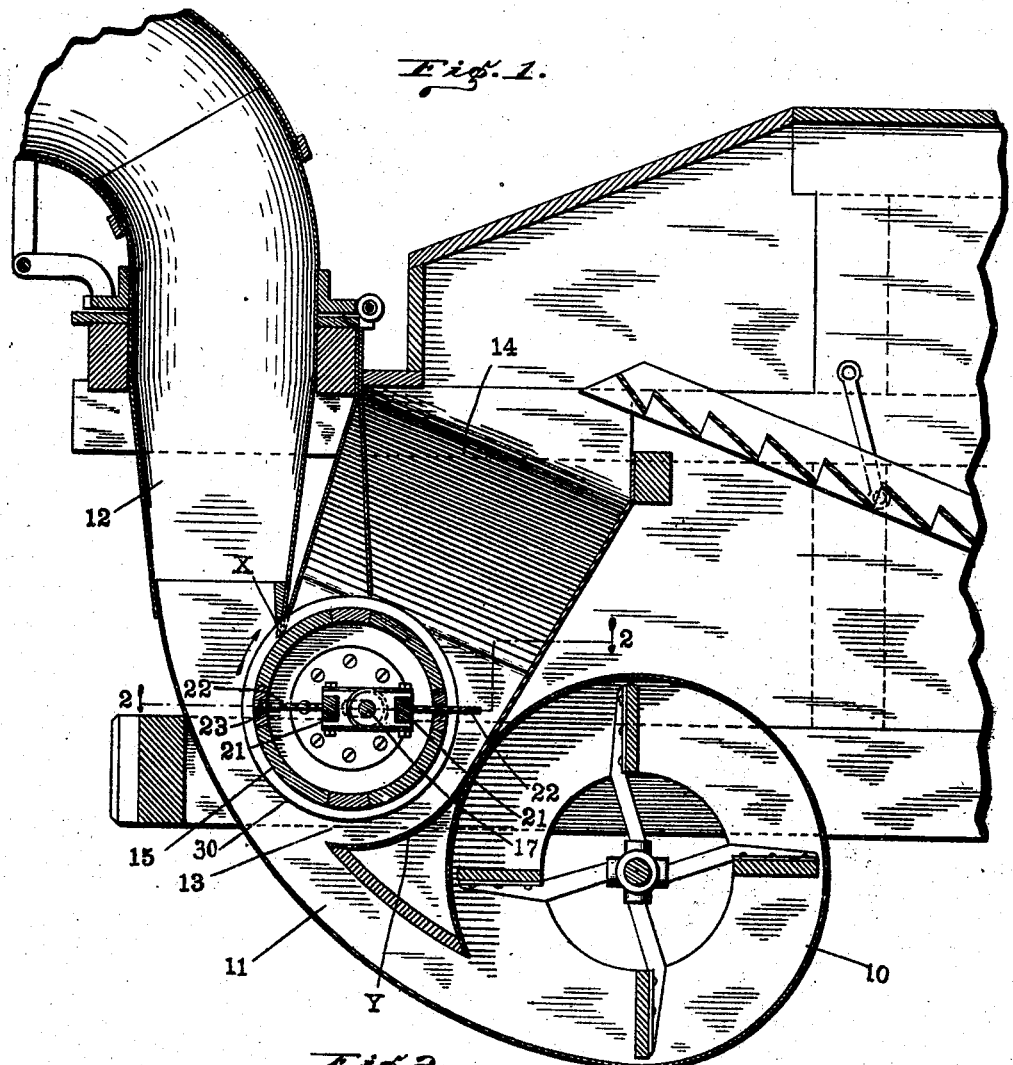
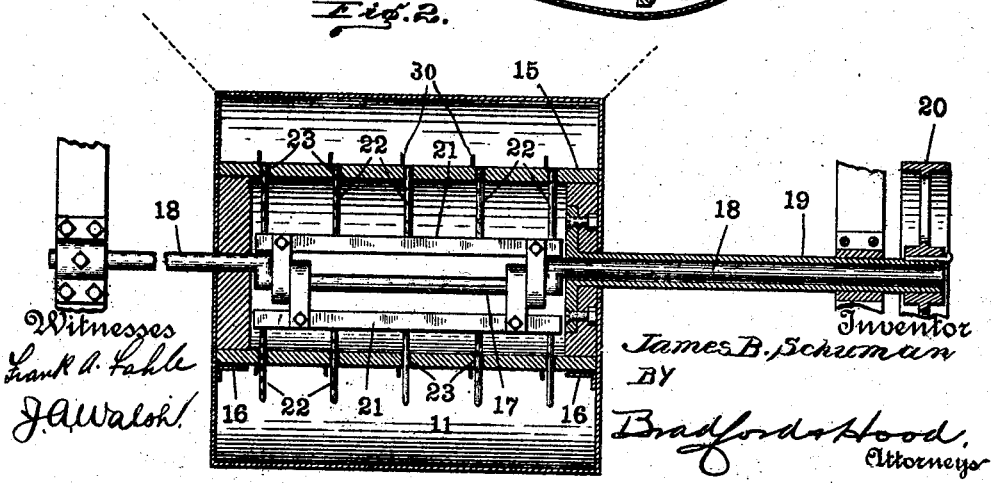

UNITED STATES PATENT OFFICE.

JAMES B. SCHUMAN, OF INDIANAPOLIS, INDIANA, ASSIGNOR OF ONE-HALF TO AUGUSTIN BOICE, OF INDIANAPOLIS, INDIANA.

PNEUMATIC STACKER.

No. 858,630.     Specification of Letters Patent.     Patented July 2, 1907.

Application filed November 13, 1905. Serial No. 286,994.

*To all whom it may concern:*

Be it known that I, JAMES B. SCHUMAN, a citizen of the United States, residing at Indianapolis, in the county of Marion and State of Indiana, have invented certain new and useful Improvements in Pneumatic Stackers, of which the following is a specification.

The object of my invention is to produce a mechanism for positively introducing straw or other material into the discharge passage of a pneumatic fan by such means as will insure the passage thereof into the stream of air, and such that there will be practically no back pressure in the introducing hopper.

The accompanying drawings illustrate my invention:

Figure 1 is a central vertical section, and Fig. 2 a section on line 2 2 of Fig. 1.

In the drawings, 10 indicates any suitable blast fan having a discharge passage 11 through which a blast of air is forced. The passage 11 discharges into any desirable form of delivery chute 12. Formed in one side (preferably the upper side) of passage 11 is an opening 13 which communicates with a hopper 14 adapted to receive the material.

Mounted within the hopper 14 at the opening 13 is a cylindrical drum 15, the face of which is as smooth as possible, and its ends guarded by suitable stationary flanges 16 arranged within the hopper 14, so as to prevent straw from working down between the ends of the drum and the hopper. Drum 15 is hollow and arranged within it is the crank 17 of the shaft 18 which is held stationary in the main frame of the machine, the drum 15 being rotated about the crank shaft in any suitable manner, as by the sleeve 19 and pulley 20.

Journaled upon the crank 17 are bars 21 each of which is provided with a plurality of radially projecting teeth 22, which teeth project through correspondingly radial openings 23 formed in the drum 15 so that, when the drum is rotated, the teeth will turn therewith so as to traverse the bottom of the hopper. Drum 15 is arranged in the opening 13 so that its surface lies as close as may be to the upper or forward edge X of said opening, and the rear side of the hopper 14, immediately adjacent the lower or rear edge of the opening 13, is made substantially concentric with said drum, as at Y, at a distance therefrom substantially equal to the amount of projection of the fingers 22 from the surface of the drum. The crank 17 is so arranged within the drum that the teeth 22 will be projected into the hopper after they have passed the edge X, and will be withdrawn into the drum after they have swept the space adjacent the portion Y in the hopper and discharged the material into the passage 11.

In operation, the throat between the portion Y of the hopper and the drum 15 will be continuously filled with material, which material is being continuously swept through said passage into the passage 11 by the fingers 22, but, as the drum rotates, these fingers will be automatically withdrawn into the drum so that the smooth face of the drum may run very close to the edge X, and thus prevent any straw from passing into the hopper, and also prevent practically the passage of air between the drum and this edge into the hopper.

I deem it advisable to insure the passage of the material into the stream of air in passage 11 by permitting a flow of air through the hopper on top of the stream of material. To accomplish this I provide the drums 15 with peripheral flanges 30 which preferably lie adjacent each of the teeth 22. These flanges 30 are of less width than the amount of projection of teeth 22 so that, as the material passes from the hopper into passage 11, it will be held away from the surface of the drum thus permitting an overlying stream of air to flow with the material from the hopper into the discharge passage 11.

I claim as my invention:

1. The combination, with a blast fan and its blast passage, of a feeding hopper leading into said passage beyond the fan, a rotatable drum mounted in the opening between said hopper and passage and having its surface arranged close to the forward edge of said opening, fingers carried by said drum and adapted to sweep material from the hopper into the fan discharge passage, means for automatically retracting and projecting said fingers, and means for holding the material away from the surface of the drum.

2. The combination, with a blast fan and its blast passage having an opening formed in its side, of a feed drum journaled in said opening with its face closely adjacent the rear side of said opening, a crank arranged within said drum, fingers journaled on said crank and adapted to project through the drum during portions of its rotation, a feed hopper leading to the drum, and means for holding the material away from the surface of the drum.

3. The combination, with a blast fan and its blast passage, of a feeding hopper leading into said passage beyond the fan, a rotatable drum mounted in the opening between said hopper and passage and having its surface arranged close to the forward edge of said opening, fingers carried by said drum and adapted to sweep material from the hopper into the fan discharge passage, means for automatically retracting and projecting said fingers, and one or more peripheral flanges carried by the drum.

4. The combination, with a blast fan and its blast passage having an opening formed in its side, of a feed drum journaled in said opening with its face closely adjacent the rear side of said opening, a crank arranged within said drum, fingers journaled on said crank and adapted to project through the drum during portions of its rotation, a feed hopper leading to the drum, and one or more peripheral flanges carried by the drum.

In witness whereof, I, have hereunto set my hand and seal at Indianapolis, Indiana, this 7th day of November, A. D. one thousand nine hundred and five.

JAMES B. SCHUMAN. [L. S.]

Witnesses:
    ARTHUR M. HOOD,
    JAMES A. WALSH.